United States Patent [19]

Song

[11] Patent Number: 5,691,778

[45] Date of Patent: Nov. 25, 1997

[54] DOUBLE-WIDE TELEVISION SET HAVING DOUBLE-DECK VIDEOCASSETTE RECORDER AND CD-OK SYSTEM AND METHOD OF CONTROLLING THE SAME USING GRAPHIC-REMOTE CONTROLLER

[75] Inventor: Kwon-eui Song, Suwon, Rep. of Korea

[73] Assignee: Samsung Electronics Co., Ltd., Kyungki-do, Rep. of Korea

[21] Appl. No.: 597,120

[22] Filed: Feb. 6, 1996

[30] Foreign Application Priority Data

Aug. 31, 1995 [KR] Rep. of Korea ............... 95-28489

[51] Int. Cl.$^6$ ............................................. H04N 5/44
[52] U.S. Cl. .................... 348/564; 348/589; 348/569; 348/734; 395/146
[58] Field of Search .......................... 348/734, 564, 348/565, 566, 601, 589, 600, 563, 569, 567, 568; 345/169, 146; 395/155, 156, 157, 159; H04N 5/44

[56] References Cited

U.S. PATENT DOCUMENTS

| | | | |
|---|---|---|---|
| 5,321,420 | 6/1994 | Rezek et al. | 345/146 |
| 5,367,316 | 11/1994 | Ikezaki | 348/734 |
| 5,416,535 | 5/1995 | Sato et al. | 348/564 |
| 5,450,079 | 9/1995 | Dunaway | 345/169 |
| 5,517,257 | 5/1996 | Dunn et al. | 348/734 |
| 5,539,479 | 7/1996 | Bertram | 348/601 |

*Primary Examiner*—John K. Peng
*Assistant Examiner*—Jeffrey S. Murrell
*Attorney, Agent, or Firm*—Sughrue, Mion, Zinn, Macpeak & Seas, PLLC

[57] ABSTRACT

A double-wide television set is integrated together with a double-deck videocassette recorder and a CD-OK system. Selection of operating modes and flow of signals among portions of the integrated system is complex. Apparatus and a method of operation are provided to simplify the complex process of controlling the double-wide television set using a graphic-remote controller are provided. The graphic-remote controller is displayed on a sub-screen of the television set in response to an input from a special graphic-remote controller key on a simplified remote control. Using the selection keys on the simplified remote control to manipulate the images of the on-screen graphic-remote controller and its various control command graphics, the various possible operations of the television set may be manipulated by the user. Selection of control commands on the displayed control command graphics is accomplished by a pointing device such as a cursor.

1 Claim, 7 Drawing Sheets

DOUBLE-WIDE TELEVISION SET HAVING DOUBLE-DECK VIDEOCASSETTE RECORDER AND CD-OK SYSTEM AND METHOD OF CONTROLLING THE SAME USING GRAPHIC-REMOTE CONTROLLER

BACKGROUND OF THE INVENTION

The present invention relates to a double-wide television set having a double-deck videocassette recorder and a CD-OK system and a method of controlling the same using a graphic remote controller.

A double-deck videocassette recorder in which two videocassette recorders are united can separately reproduce from each videocassette recorder. Specifically, the double-deck videocassette recorder has a "copy" function that a signal reproduced from one videocassette recorder is recorded onto the other videocassette recorder.

On the other hand, a double-wide television set is for displaying an image signal on a wide screen (16:9 aspect ratio) and for simultaneously displaying two image signals introduced from each different signal source on the wide screen which is divided into right and left sub-screens.

Also, while viewing the display of the double-wide television set, it is possible to simultaneously view an image signal reproduced from an external picture reproducing apparatus such as videocassette recorder, laser disk player or CD-OK system (karaoke machine).

Therefore, if the double-deck videocassette recorder and CD-OK system are electrically connected to the double-wide television set, it is possible to perform various operations: to simultaneously view the image signal input to the television set and that reproduced from the double-deck video tape recorder; to record information on the video tape while viewing the input image signal; to record the signal reproduced from one video tape onto the other video tape while viewing the reproduced image signal; to listen to music and sing a song while viewing a background image signal of the CD-OK system and while viewing the image signal reproduced from the videocassette recorder.

However, in order to record the image signal input to television set on the videocassette recorder, first, an external output terminal of the television set and an external input terminal of the videocassette recorder need to be connected together, then a channel, to which the image signal intended for recording is input, is selected by adjusting the television set. Thereafter, the videocassette recorder must be adjusted to perform a recording mode.

On the contrary, in order to view the image signal reproduced from the videocassette recorder via the television set, first, an external output terminal of the videocassette recorder and an external input terminal of the television set must be connected to each other, or an RF output terminal of the videocassette recorder and an antenna input terminal of the television set should be connected together. Then, the videocassette recorder is adjusted to perform a reproducing mode, after which the television set is adjusted to perform an external image signal receiving mode or a predetermined channel is selected.

Also, in order to reproduce the image signal of the CD-OK system using the double-wide television set, an external output terminal of the CD-OK system and the external input terminal of the television set need to be connected.

Since the external input and output terminals of the image processors are placed at the rear of the main body, the position of the picture processor must be shifted in order for a user (or technician) to access the rear side of the picture processor to electrically connect the terminals.

Also, once the terminals have been electrically connected, each apparatus must be operated in proper sequence according to the intended purpose for the desired result. The user should, thus, be rather skilled to operate each apparatus.

Specifically, when the various operations are performed by electrically connecting the double-wide television set, which can simultaneously process two image signals, and the double-deck videocassette recorder, more cabling and much more highly skilled operation are required than when the general television set and videocassette recorder are connected.

Therefore, according to the present invention, a double-wide television set is provided in order to solve the above problem, wherein the double-deck videocassette recorder and the CD-OK system are united within the double-wide television set to form an audiovisual (A/V) complex. Thus, optimized operation can be performed easily without various complicated operations caused by connecting the various apparatuses to one another with cables.

Recently, various audiovisual (A/V) apparatuses have been combined with each other and their function has been diversified, so that many additional controlling buttons are required. In addition, there is an ongoing trend toward the simplification of appearance. Thus, most controlling buttons are separately attached to a remote controller.

However, if the remote controller for controlling the A/V complex is inoperative, many problems occur. Also, it is inconvenient to use the remote controller due to the additional controlling buttons needed for the various functions of the A/V complex.

By perceiving the above problems, a simplified remote controller is provided, wherein the frequently used input keys related with power, channel and volume are only used under the normal conditions. When a graphic-remote controller key (on the remote controller) is operated, the screen of the double-wide television set is divided into two sub-screens and the remote controller graphic information (graphic-remote controller) is displayed on one sub-screen, whereby the A/V complex can be easily controlled by moving a cursor placed on the sub-screen.

SUMMARY OF THE INVENTION

It is an object of the present invention to provide a double-wide television set including a double-deck videocassette recorder and a CD-OK system, and a method of controlling the double-wide television set using a graphic-remote controller. The graphic-remote controller is displayed on a screen using a simplified remote controller having a predetermined key for selecting the displayed graphic-remote controller, thereby easily controlling the double-wide television set.

To achieve the above object, there is provided a double-wide television set having a double-deck videocassette recorder and a CD-OK system to form an audiovisual (or A/V) complex. The A/V complex comprises:

(a) a television signal receiver including two or more tuners for demodulating a broadcast signal transmitted from a broadcasting station to provide a composite image signal, and two or more demodulators which are dependently connected to the tuners, for demodulating an A/V signal from the composite image signal generated from each tuner;

(b) a double-deck videocassette recorder having two or more videocassette recorders, for providing the image signal simultaneously or separately reproduced from each videocassette recorder to a signal processor, for simultaneously or separately recording the A/V signal input thereto, and for recording the image signal reproduced by one videocassette recorder using another videocassette recorder;

(c) a CD-OK system for providing karaoke functions;

(d) an A/V signal selector for providing left and right sub-screen video signals, left and right sub-screen audio signals, a first A/V signal, a second A/V signal and a third A/V signal by selectively switching a plurality of A/V signals provided from the television signal receiver and the double-deck videocassette recorder;

(e) a video signal processor for double-wide-processing the left and right video signals output from the A/V signal selector and for providing the result to a driver for driving a displaying device;

(f) an audio signal processor for surround-processing the left and right audio signals output from the A/V signal selector and providing the result to left and right speakers;

(g) a television set controller having a first microcomputer, for controlling the television signal receiver, video signal processor and audio signal processor;

(h) a double-deck videocassette recorder controller for controlling the double-deck videocassette recorder; and (i) a master controller having a master microcomputer, for controlling the television set, television set controller, double-deck videocassette recorder, double-deck videocassette recorder controller, and CD-OK system in accordance with an input control command.

Also, there is provided a method of controlling the double-wide television set having a double-deck videocassette recorder and a CD-OK system using a graphic-remote controller, using a simplified remote controller having a graphic-remote controller key and one or more selection keys. The method comprises the steps of:

(a) displaying the graphic-remote controller on the sub-screen of the double-wide television set by depressing the graphic-remote controller key;

(b) selecting a predetermined block in said graphic-remote controller displayed on the sub-screen in step (a) by depressing one of said selection keys, and displaying on the sub-screen a control command graphic of the selected block;

(c) inputting a predetermined control command by shifting a cursor position in the control command graphic displayed in step (b);

(d) performing an operation corresponding to the predetermined control command input from said step (c);

(e) displaying the graphic-remote controller on the sub-screen if the operation is completed in step (d) and awaiting another input; and (f) terminating the program if the graphic-remote controller key is depressed and returning to step (b) if any of the selection keys, other than the graphic-remote controller key, is depressed.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

Figure 1:
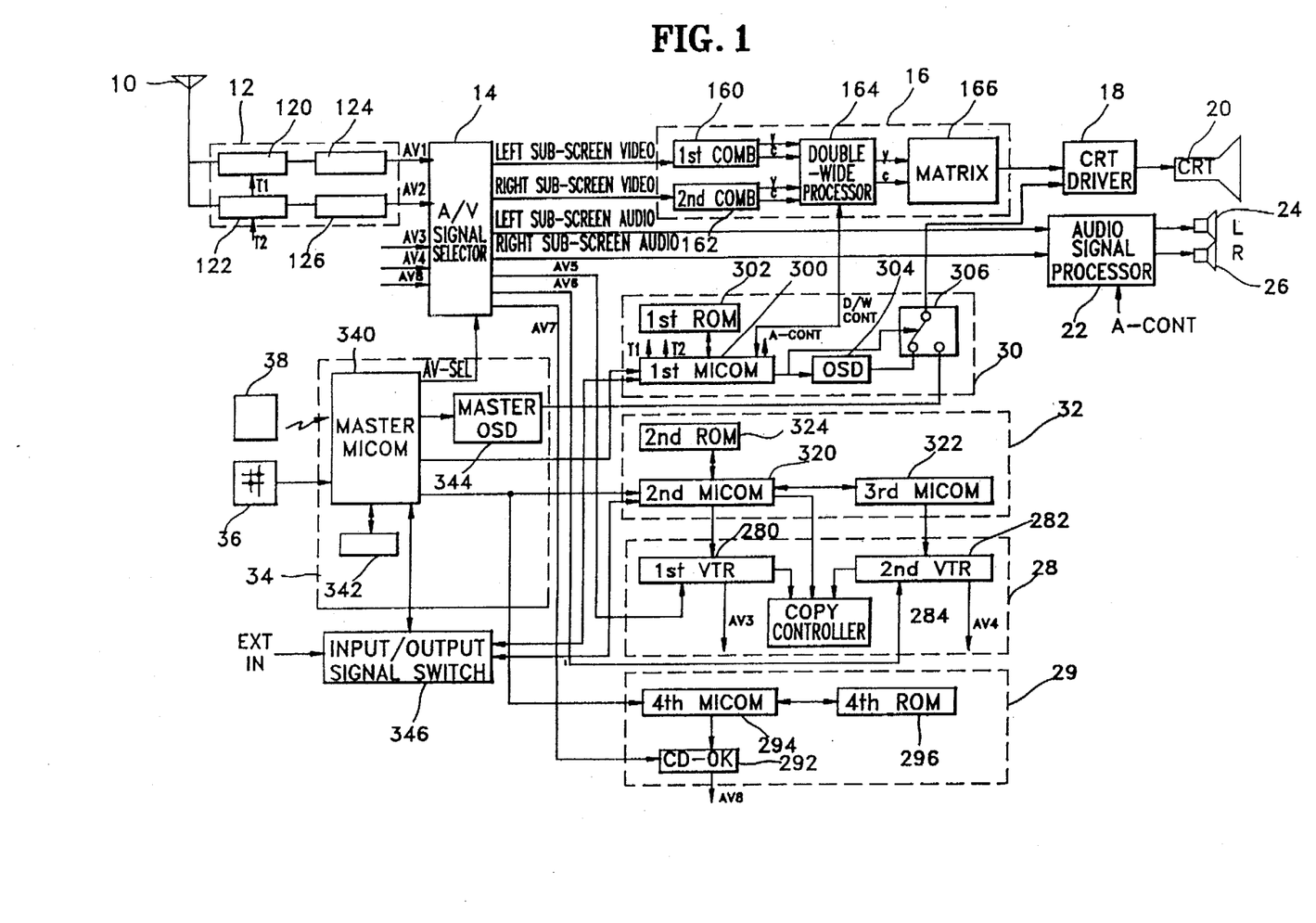
FIG. 1 is a block diagram showing the structure of a double-wide television set including a double-deck videocassette recorder and a CD-OK system according to the present invention.

The double-wide television set shown in FIG. 1 comprises an antenna 10, a television signal receiver 12, an audio/video (A/V) signal selector 14, a video signal processor 16, a CRT driver 18, a CRT 20, an audio signal processor 22, left and right speakers 24 and 26, a double-deck videocassette recorder 28, a CD-OK system 29, a television set controller 30, a double-deck videocassette recorder controller 32 and a master controller 34.

Television signal receiver 12 includes first and second tuners 120 and 122 for generating an image signal introduced via antenna 10, and first and second demodulators 124 and 126 for generating predetermined first and second audio/video signals AV1 and AV2 by receiving the image signal generated from first and second tuners 120 and 122, respectively.

Video signal processor 16 includes first and second comb filters 160 and 162 for receiving each video signal of the left and right sub-screens, selected by A/V signal selector 14 and, dividing the received signals into first luminance (Y) and chrominance (C) signals and second luminance and chrominance signals and outputting the result. The double-wide processor 164 performs double-wide-processing on the first and second luminance and chrominance signals output from the first and second comb filters 160 and 162 and outputs the result as third luminance and chrominance signals to matrix 166. Matrix 166 generates RGB signals by matrix-processing the third luminance and chrominance signals output from double-wide processor 164.

Double-deck videocassette recorder 28 includes first and second videocassette recorders (VTRs) 280 and 282 for generating third and fourth audio/video signals AV3 and AV4. Alternatively, VTRs 280 and 282 record fifth and sixth audio/video signals (AV5 and AV6) output from A/V signal selector 14 onto a video tape. The copy controller 284 controls the copy function between first and second VTRs 280 and 282.

Double-deck videocassette recorder controller 32 includes a second microprocessor 320 connected to a second ROM 324 and a third microprocessor 322. The third microprocessor 322 operates as a slave to the second microprocessor 320. The second microprocessor 320 is under the control of master microprocessor 340.

Television set controller 30 includes an on-screen display (OSD) 304, a first microprocessor 300, a first ROM 302 in which a control program of first microprocessor 300 is recorded, and an OSD selector 306 for selectively switching between OSD 304 and a master OSD 344. First microprocessor 300 controls first and second tuners 120 and 122, double-wide processor 164, audio processor 22 and OSD 304. The first microprocessor is under the control of a master microprocessor 340.

CD-OK system 29 includes a CD-OK (karaoke) device 292 for generating an eighth A/V signal AV8 by receiving a seventh A/V signal AV7 output from A/V signal selector 14 and outputting the eighth A/V signal to A/V signal selector 14. The CD-OK system 29 also has a fourth microprocessor 294 for controlling CD-OK 292 under the control of master microprocessor 340 and a fourth ROM 296 on which a control program of fourth microprocessor 294 is recorded.

Master controller 34 includes master microprocessor 340 which is connected to a third ROM 342 and a master OSD 344.

The operation of the apparatus shown in FIG. 1 will now be described in detail. Television signal receiver 12 demodulates the broadcast signal introduced from antenna 10 to output first and second A/V signals AV1 and AV2. On the other hand, double-deck videocassette recorder 28 outputs third and fourth A/V signals AV3 and AV4 which are reproduced from first and second VTRs 280 and 282, respectively. CD-OK system 29 generates the eighth A/V signal AV8.

A/V signals AV1 and AV2, output from television signal receiver 12, AV3 and AV4, output from double-deck videocassette recorder 28, and AV8, output from CD-OK system 29, are provided to the A/V signal selector 14.

A/V signal selector 14 selectively combines a plurality of A/V signals AV1, AV2, AV3, AV4 and AV8 input via an input terminal thereof and outputs the results as left and right sub-screen video signals, left and right sub-screen audio signals, and fifth, sixth and seventh A/V signals.

Figure 2:
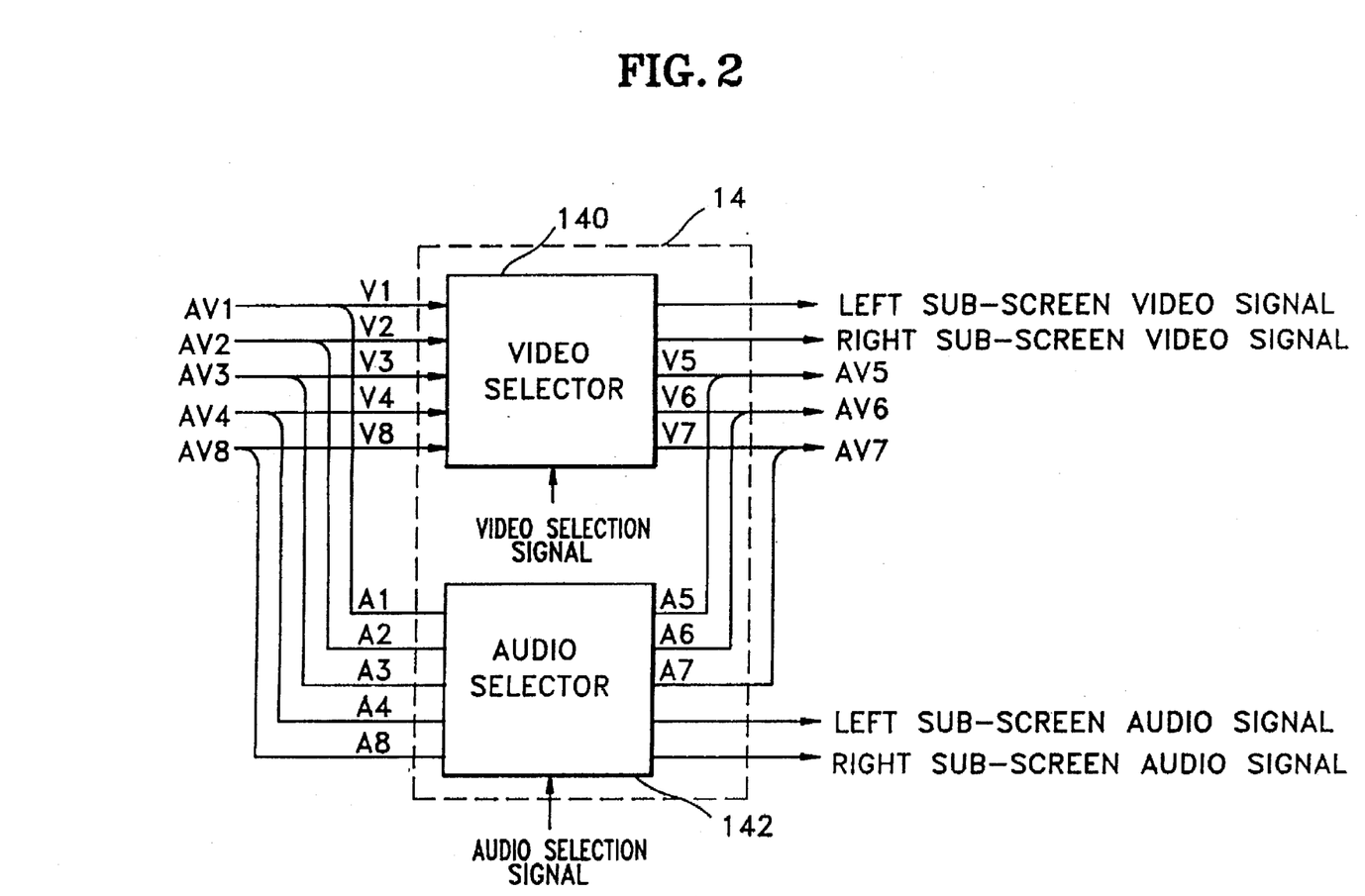
FIG. 2 is a detailed block diagram showing the structure of an audio/video signal selector shown in FIG. 1.

FIG. 2 is a detailed block diagram showing the structure of A/V signal selector 14 shown in FIG. 1. A/V signal selector 14 includes a video signal selector 140 and an audio signal selector 142.

Video signal selector 140 receives the first to fourth video signals V1, V2, V3, V4 and the eighth video signal VS, selectively combines the received video signals, and outputs the result as left and right sub-screen video signals, and the fifth, sixth and seventh video signals V5, V6, V7.

The pattern of the output video signals is determined according to a video signal selection signal which is output from master controller 34 and provided to video signal selector 140.

Audio signal selector 142 receives the first to fourth audio signals A1, A2, A3, A4 and the eighth audio signal A8, selectively combines the received audio signals and outputs the result as left and right sub-screen audio signals, a fifth audio signal A5, a sixth audio signal A6 and a seventh audio signal A7. In this case, the pattern of the output audio signals is determined according to an audio signal selection signal which is output from master controller 34 and provided to audio signal selector 142.

For extending the usable range of the apparatus, it may be allowed that an additional A/V signal is provided from outside the A/V complex or an A/V signal generated inside the A/V complex is output.

Figure 3:
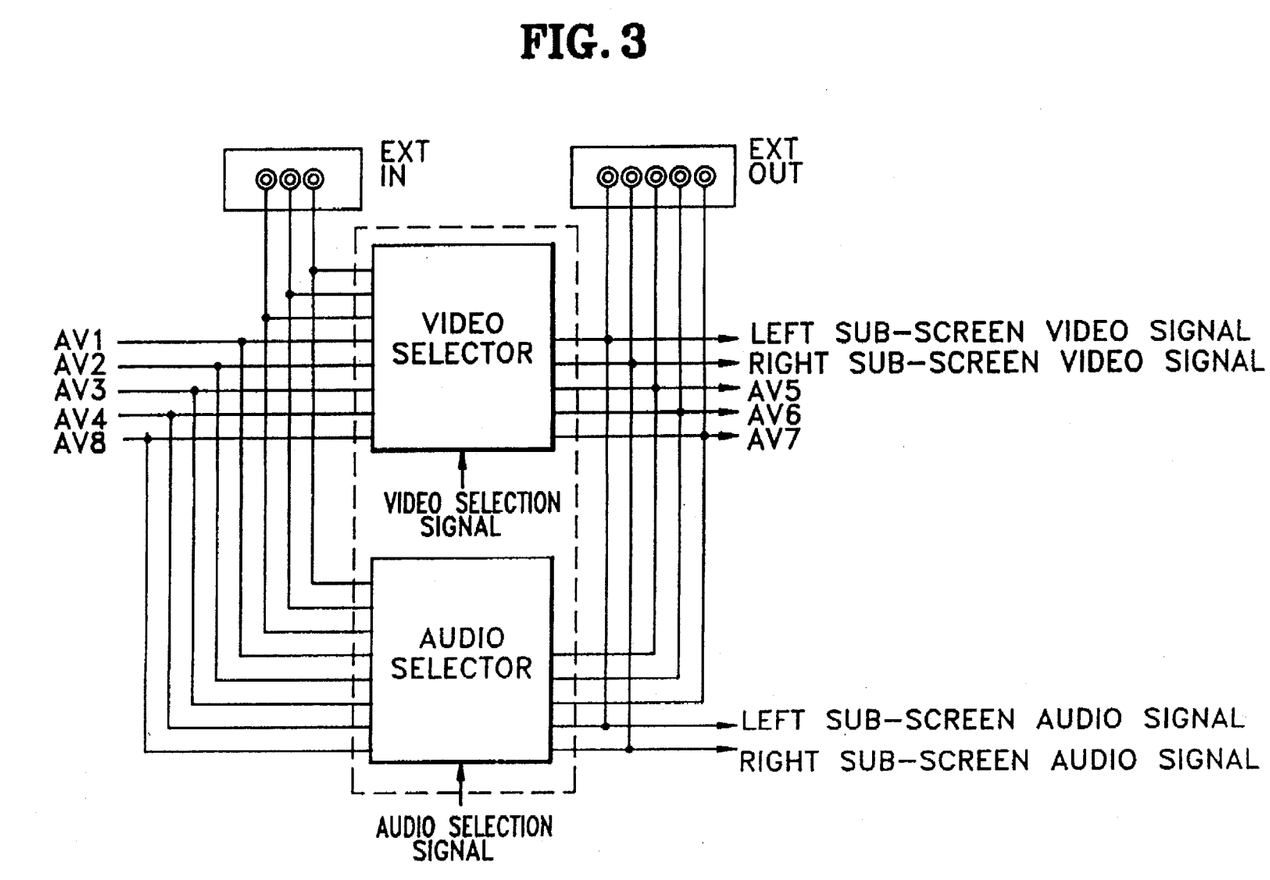
FIG. 3 is a detailed block diagram showing the structure of another audio/video signal selector shown in FIG. 1 according to the present invention.

FIG. 3 is a block diagram showing the structure of another A/V signal selector 14 shown in FIG. 1 according to the present invention. The A/V signal selector shown in FIG. 3 has excess A/V signal input terminals (EXT IN) for the A/V signals input from the outside. Also, the A/V signal selector comprises excess A/V signal output terminals (EXT OUT) for outputting the inner A/V signals.

Video signal processor 16 double-wide processes the left and right sub-screen video signals provided from A/V signal selector 14 and outputs the result. The horizontal and vertical scanning period of each image signal prior to the combining of the image signals and the horizontal and vertical scanning periods of the combined image signal should be matched so as to simultaneously display two image signals on one screen. Here, it is assumed that the horizontal and vertical scanning periods of two image signals are the same. If the horizontal and vertical scanning periods of the two images are different from each other, a specific process is required. The technology related with this specific process has been applied to NTSC/PAL and HD/NTSC converters.

The scanning period of the combined image signal is controlled using a memory (not shown). For this purpose, the video signal is divided into a luminance signal and a chrominance signal via first and second comb filters 160 and 162, digitized, and then recorded in the memory. The scanning period of the output image signal can be determined by controlling the speed of reading-out from the memory.

Figure 4:
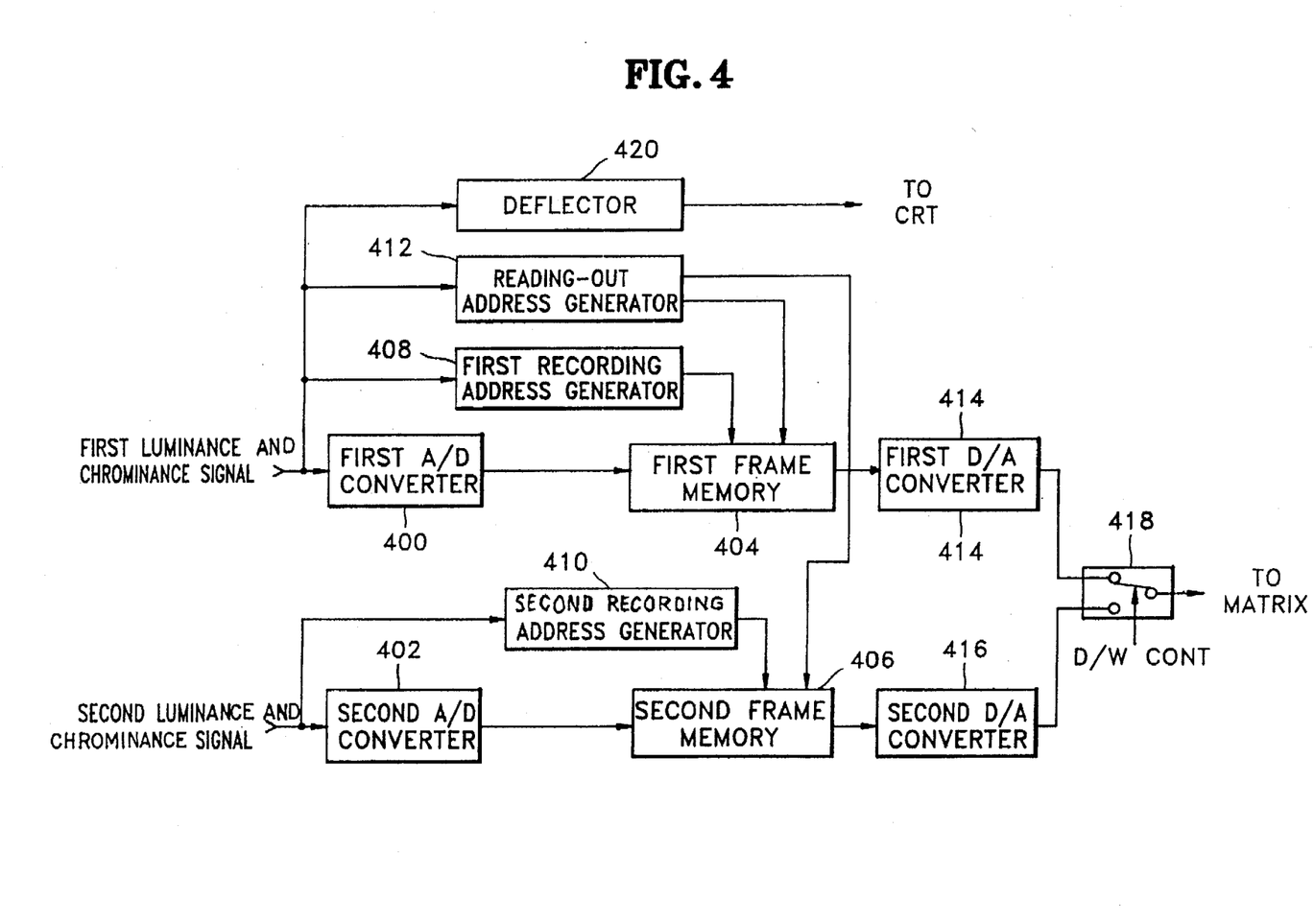
FIG. 4 is a detailed block diagram showing the structure of a double-wide processor shown in FIG. 1.

FIG. 4 is a detailed block diagram showing the structure of double-wide processor 164 shown in FIG. 1. Double-wide processor 164 shown in FIG. 4 comprises first and second analog/digital (A/D) converters 400 and 402, first and second frame memories 404 and 406, first and second recording address generators 408 and 410, a reading-out address generator 412, the first and second digital-to-analog (D/A) converters 414 and 416, a left/right sub-screen switch 418 and a deflector 420.

The operation of double-wide processor 164 shown in FIG. 4 will be described in detail. First and second recording address generators 408 and 410 each generate a recording address whose recording speed is the same as the scanning speed of each of the left and right sub-screen video signals. The video signals digitized by first and second A/D converters 400 and 402 are recorded on first and second frame memories 404 and 406. Here, each recording speed of first and second frame memories 404 and 406 is the same as each scanning speed of the left and right screen video signals.

Reading-out address generator 412 generates a reading-out address having a reading-out speed corresponding to twice scanning speed of the left and right sub-screen video signals. Thus, each reading-out speed of first and second frame memories 404 and 406 corresponds to twice scanning speed of the left and right sub-screen video signals.

The horizontal scanning period of the image signal is divided into first and second halves. The video signal recorded in first frame memory 404 is read out during the first half and the video signal recorded on second frame memory 406 is read out during the second half. When the video signals are read out at a speed corresponding to twice recording speed of each video signal, two image signals can be output as one combined image signal.

Figure 5:
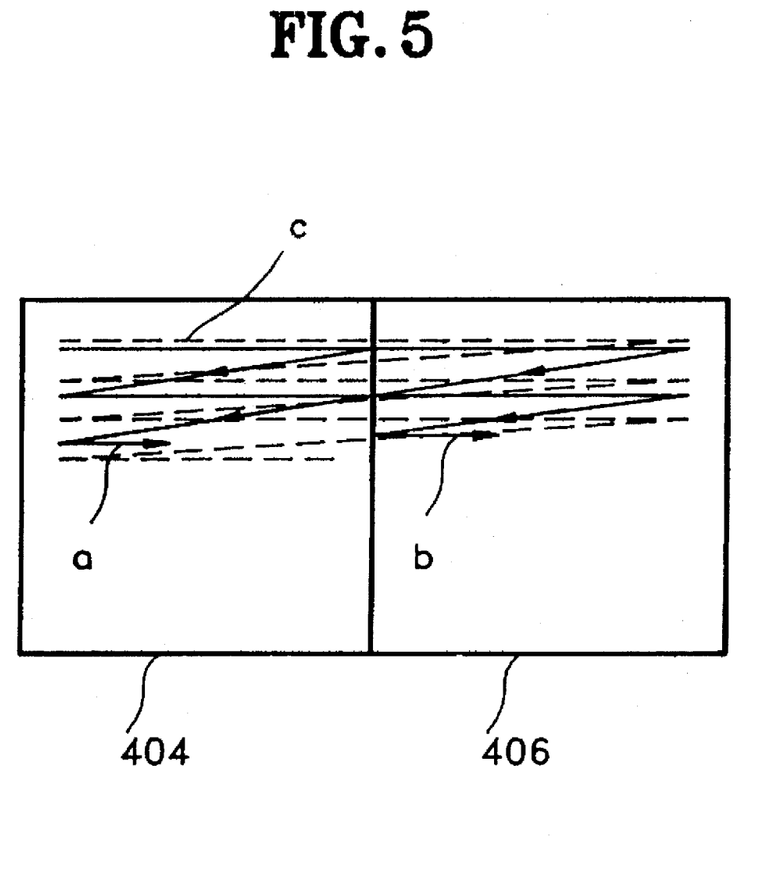
FIG. 5 is a diagram schematically illustrating the operation of the double-wide processor shown in FIG. 4.

FIG. 5 is a diagram schematically illustrating the recording and reading-out operations of the first and second frame memories 404 and 406. In FIG. 5, solid lines a and b represent the recording operation, and dashed line c represents the reading-out operation. As shown by solid lines a and b, each video signal is separately recorded on each of frame memories 404 and 406. Here, the recording speed is the same as the scanning speed of each video signal. After the video signal is recorded on two frame memories 404 and 406, the video signal is continuously read out regardless of the frame memory (i.e., from both frame memories) and the reading-out speed is twice the recording speed.

Thus, the speed for recording each video signal is the same as that for continuously reading-out two recorded signals, and a video signal can be obtained by combining two video signals.

Left/right sub-screen switch 418 shown in FIG. 4 changes the switching sequence of the signal read out from first and second frame memories 404 and 406, to thereby reverse the left and right sub-screens on the screen.

CRT driver 18 shown in FIG. 1 allows the image signal to be displayed by driving CRT 20 using the RGB signal output from video signal processor 16.

Audio signal processor 22 provides the left/right sub-screen audio signal provided from A/V signal selector 14 to left and right speakers 24 and 26 by performing surrounding and speaker/headphone selecting process. Here, it is possible to select the output mode of the audio signal, that is, the audio signal corresponding to the video signal of the left/right sub-screen video signal is output to the left and right speakers or the audio signal corresponding to the video signal of the left screen is output to the left and right speakers and that corresponding to the video signal of the right screen is output to the headphone output terminals (not shown).

Double-deck videocassette recorder 28 provides A/V signal reproduced from two VTRs 280 and 282 to A/V signal selector 14, separately or simultaneously records the fifth and sixth A/V signals provided from A/V signal selector 14 each using VTRs 280 and 282, or records the A/V signal reproduced from one VTR using the other VTR.

Here, first VTR 280 is a videocassette recorder adopting the VHS mode and second VTR 282 is a videocassette recorder adopting the 8 mm mode. Thus, both 8 mm and VHS modes are possible by selecting between the two decks.

Television set controller 30 controls tuners 120 and 122 and video signal processor 16 in response to the command input by the operation of a key input portion 36, a remote controller 38 or an input/output signal switch 346. Television set controller 30 controls the channel selecting operation of tuners 120 and 122 by generating first and second tuner control signals T1 and T2. Two channels can be simultaneously viewed by designating each desired broadcast channel using the respective tuners.

Furthermore, television set controller 30 generates a double-wide control signal (D/W CONT) and a right and left reverse signal (REVERSE) to control video signal processor 16.

A program required for controlling the television set is stored in first ROM 302 of television set controller 30. First microprocessor 300 performs the control operation according to the program recorded in first ROM 302 and generates a character signal for a user interface via OSD 304.

The OSD switch 306 selectively provides the OSD signal generated from OSD 304 or the master controller 34, to CRT driver 18. CRT driver 18 drives CRT 20 according to the signal obtained by overlapping the OSD signal provided by OSD switch 306 with the RGB signals provided by video signal processor 16.

Double-deck videocassette recorder controller 32 includes two microprocessors 320 and 322, one of which is for first VTR 280 and the other is for second VTR 282. That is, second microprocessor 320 is directly controlled by master controller 34. However, third microprocessor 322 is dependent upon second microprocessor 320, so that it operates according to master controller 34 via second microprocessor 320, or under the control of second microprocessor 320.

Since the frequency in use of second VTR 282 adopting the 8 mm mode, which is used for reproducing the signal recorded by a movie camera, is lower compared with first VTR 280 adopting the VHS mode, second microprocessor 320 controls third microprocessor 322, to thereby reduce the load of master controller 34.

Master controller 34 controls television set controller 30, double-deck videocassette recorder controller 32 and A/V signal selector 14 so as to be properly operated corresponding to the operation command input via key input portion 36, remote controller 38 or input/output signal switch 346.

A program required for numerous controlling processes is stored in third ROM 342 of master controller 34. Master microprocessor 340 performs a controlling operation using the program of third ROM 342 and generates a character signal for a user interface via master OSD 344.

Master controller 34 controls A/V signal selector 14 by generating an audio/video selection signal (AV_SEL), so that a proper signal suitable for a predetermined operation can be provided to video signal processor 16, audio signal processor 22 and double-deck videocassette recorder 28.

Since there are many input and output signals in the double-wide television set having the double-deck videocassette recorder and the CD-OK system, user interface via the OSD is stressed for properly selecting the input/output signal.

Thus, in order to reinforce the user interface function, the OSD for only master controller 34 is installed.

Figures 6A, 6B:
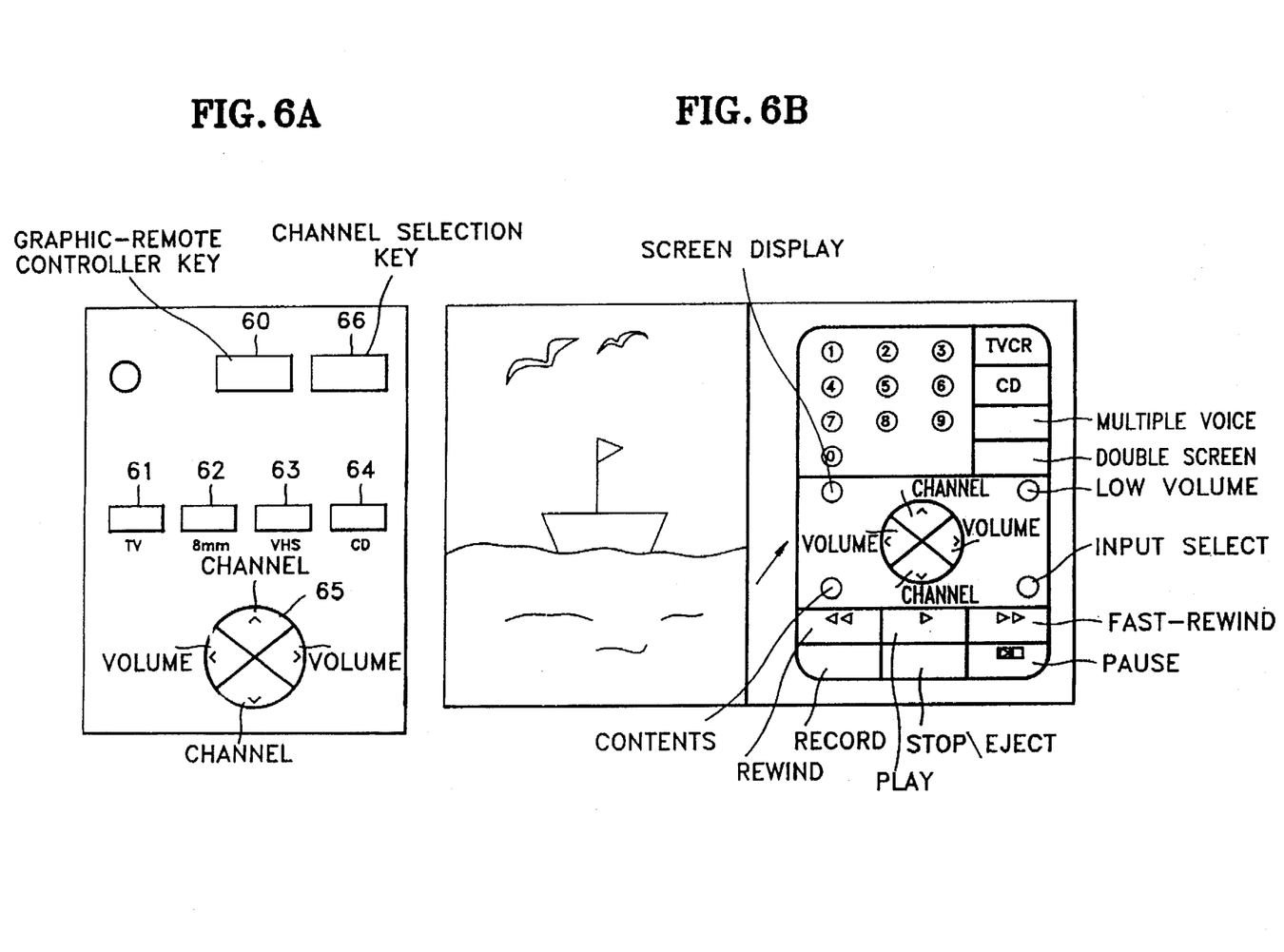
FIG. 6A is a diagram showing a simplified remote controller for controlling the double-wide television set according to the present invention.
FIG. 6B is a diagram showing a graphic-remote controller displayed on the double-wide television set by the simplified remote controller shown in FIG. 6A.

FIG. 6A is a diagram showing a simplified remote controller for controlling the double-wide television set including the double-deck videocassette recorder and the CD-OK system according to the present invention, and FIG. 6B is a diagram showing a graphic-remote controller which is caused to be displayed on the double-wide television set by the simplified remote controller shown in FIG. 6A.

Figure 6C:
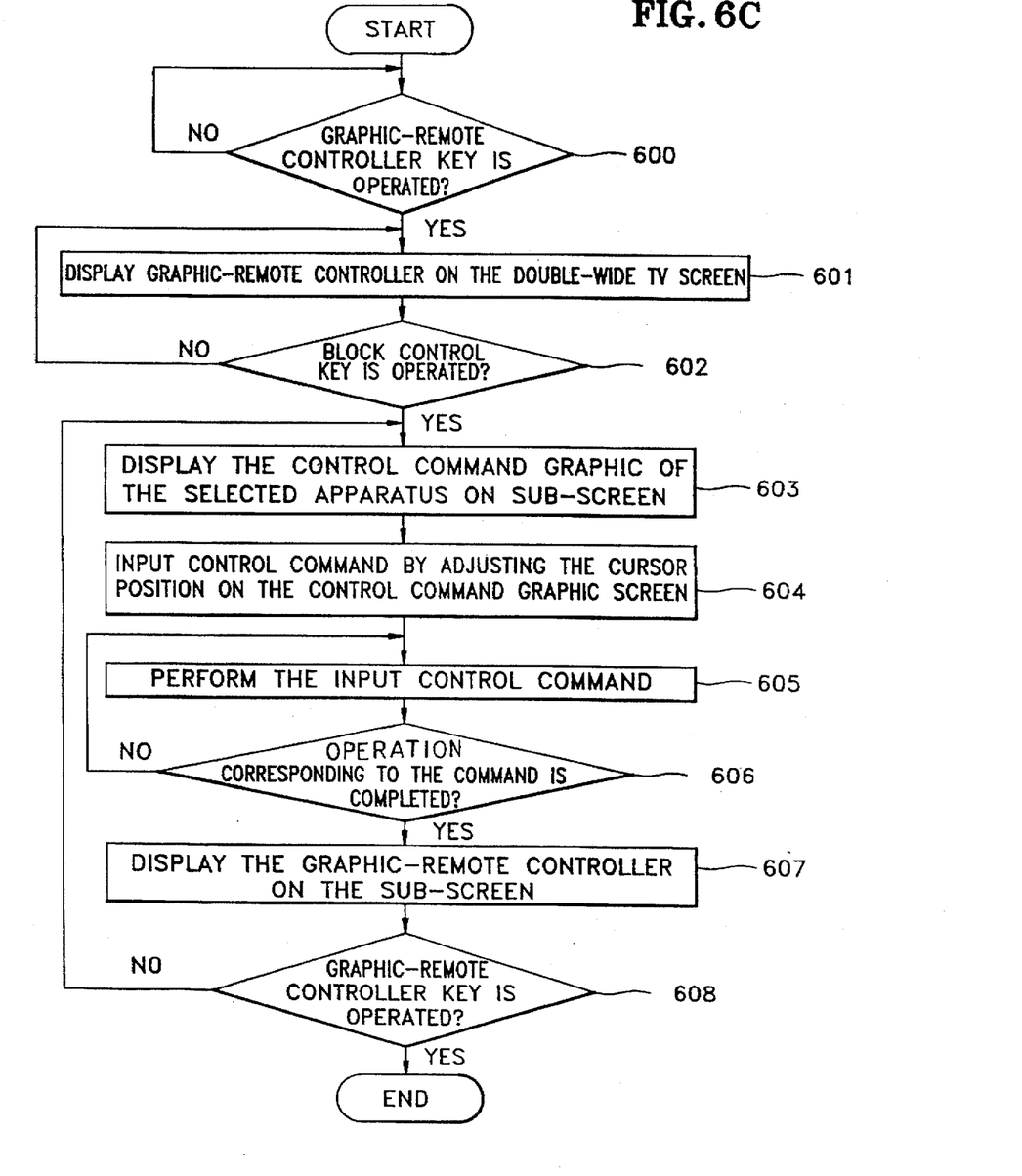
FIG. 6C is a flowchart illustrating the controlling method using the graphic-remote controller in the double-wide television set according to the present invention.

FIG. 6C is a flowchart illustrating the controlling method using the graphic-remote controller in the double-wide television set including the double-deck videocassette recorder and the CD-OK system according to the present invention. The flowchart illustrates the controlling operation of master microprocessor 340 shown in FIG. 1.

Hereinafter, the controlling method using the graphic-remote controller in the double-wide television set having the double-deck videocassette recorder and the CD-OK system will be described with reference to FIGS. 1 to 6A–6C.

While the power is applied to the double-wide television set having the double-deck videocassette recorder and CD-OK system, if a graphic-remote controller key 60 mounted on the simplified remote controller shown in FIG. 6A is operated, the graphic-remote controller is displayed by master microprocessor 340 shown in FIG. 1.

That is, master microprocessor 340 determines whether graphic-remote controller key 60 is input (step 600) and displays the graphic-remote controller on the double-wide television set screen (hereinafter referred to as "screen") (step 601).

If the screen is in the double-wide state, the graphic-remote controller is displayed on the right sub-screen and television broadcast, CD-OK image signal or reproduced video tape signal on the left sub-screen.

When the graphic-remote controller is displayed on the right sub-screen, a user operates an intended one of predetermined block control keys 61, 62, 63 and 64 for controlling each apparatus (that is, the double-wide television set, 8 mm or VHS videocassette recorder, or CD-OK system), using the simplified remote controller.

Here, the control command graphic of the selected block is displayed on the sub-screen and thus a user can input a control command by adjusting the cursor position in the control command graphic displayed on the screen using a volume up/down key 65 and a channel selection key 66.

If the control command is completely input to the double-wide television set having the double-deck videocassette recorder and CD-OK system, the program is terminated by operating graphic-remote controller key 60 of the simplified remote controller.

Then, the controlling method of master microprocessor 340 will be described.

First, it is determined whether graphic-remote controller key 60 is input (step 600). If graphic-remote controller key 60 is input, the graphic-remote controller is displayed on the sub-screen (step 601).

If the graphic-remote controller is displayed on the sub-screen, it is determined whether an intended one of the predetermined block control keys 61, 62, 63 and 64 for controlling each apparatus (that is, the double-wide television set, 8 mm or VHS videocassette recorder, or CD-OK system) is input (step 602).

If one of the block control keys 61, 62, 63 and 64 is input, the control command graphic of the selected apparatus, that is, the double-wide television set, 8 mm or VHS videocassette recorder, or CD-OK system, is displayed on the sub-screen (step 603). Thereafter, the control command is input by adjusting the cursor position on the control command graphic screen (step 604). Master microprocessor 340 performs the input control command (step 605) and if the operation corresponding to the command is completed (step 606), the graphic-remote controller is displayed on the sub-screen (step 607). If the graphic-remote controller key 60 of a simplified remote controller is input (step 608), the program is terminated and if another function key is input, the operation corresponding to the input function key is performed (step 603).

As described above, an A/V system including a double-wide television set, a double-deck videocassette recorder and a CD-OK system which are collectively controlled therein, can be obtained.

Also, in the remote controller of the double-wide television set having the double-deck videocassette recorder and CD-OK system, the graphic-remote controller is displayed on the sub-screen using an extra simplified remote controller, so that the double-wide television set can be easily controlled.

What is claimed is:

1. A method of controlling a double-wide television set having at least one sub-screen, using a simplified remote controller having a graphic-remote controller key and one or more selection keys, said method comprising the steps of:

(a) displaying the graphic-remote controller on the sub-screen of the double-wide television set by depressing the graphic-remote controller key;

(b) selecting a predetermined block in said graphic-remote controller displayed on the sub-screen in step (a) by depressing one of said selection keys, and displaying on the sub-screen a control command graphic of the selected block;

(c) inputting a predetermined control command by shifting a cursor position in the control command graphic displayed in step (b);

(d) performing an operation corresponding to the predetermined control command input from said step (c);

(e) displaying the graphic-remote controller on the sub-screen if the operation is completed in step (d) and awaiting another input; and (f) terminating the program if the graphic-remote controller key is depressed and returning to step (b) if any of the selection keys, other than the graphic-remote controller key, is depressed.

* * * * *